Fig. 1.

INVENTOR.
JOHN H. STROOP

INVENTOR.
JOHN H. STROOP
BY
ATTORNEY

Jan. 28, 1969

J. H. STROOP 3,423,902

PRODUCTION AND FILLING OF PLASTIC CONTAINERS

Filed Dec. 17, 1965

INVENTOR.
JOHN H. STROOP
BY
ATTORNEY

Jan. 28, 1969    J. H. STROOP    3,423,902
PRODUCTION AND FILLING OF PLASTIC CONTAINERS
Filed Dec. 17, 1965    Sheet 6 of 7

INVENTOR.
JOHN H. STROOP
BY
ATTORNEY

Jan. 28, 1969    J. H. STROOP    3,423,902
PRODUCTION AND FILLING OF PLASTIC CONTAINERS
Filed Dec. 17, 1965

INVENTOR.
JOHN H. STROOP
BY
ATTORNEY

United States Patent Office 3,423,902
Patented Jan. 28, 1969

3,423,902
PRODUCTION AND FILLING OF
PLASTIC CONTAINERS
John H. Stroop, New York, N.Y., assignor to Total
Packaging Inc., New York, N.Y., a corporation of
New York
Filed Dec. 17, 1965, Ser. No. 514,595
U.S. Cl. 53—112
Int. Cl. B65b 1/16, 31/04

8 Claims

ABSTRACT OF THE DISCLOSURE

A machine for continuously forming, filling, sealing, and separating a sequence of plastic containers, including a bank of vertically reciprocating cam-following die-sets, which close on a down-stroke about downwardly fed dual layers of hot plastic sheeting, gas pressure supply means for supplying gas under pressure into the closed die-sets between the dual layers, thereby forming the sheeting to the interior contour of the dies, and product supply means for filling the formed container with a product, At the bottom of the down-stroke, the die-sets are opened by cam-action to release the containers and remaining open, move through an upstroke to complete a cycle. On the next cycle, the die-sets close again to seal the top of the previous containers and separate them with a hot pressure-cut knife from the bottom of the next successive containers being formed, thereby producing the continuous series of separate filled plastic containers.

Background of the invention

Plastic containers adapted to dispense milk products and lubricating oils, and various other products are in extremly large use and in great demand.

One object of this invention is to produce by moulding and simultaneously filling containers of plastic or metal foil having volumetric shapes susceptible of being boxed or packed in crates with maximum economy of space.

Another object is to provide opposed sheets or curtains of plastic material and a split mould structure having at least one split mould and preferably four or more split moulds formed therein into which the opposed sheets are expanded while the mould travels temporarily with and advances the sheets and is then cyclically returned to a new starting position on the advancing sheets, and the operation repeated.

Another object is to provide a multipassage tubular connection to the interior of each container as it is formed whereby air pressure may first be applied to force the plastic sheets into the mould and shape the container, then vacuum to exhaust the container and to draw the desired liquid under pressure into the finished package.

Another object is to provide for the multiple unit production of plastic containers with simultaneous forming of the containers in moulds, then liquid filling and sealing the containers as completed so that large quantities of filled containers may be produced in any unit of time.

Another object is to use commercially available plastic films in the form of rolls from which the plastic sheets or curtains are withdrawn.

Another object is to provide a plastic container with a protective cover having a quick and easily removable top opening pour spout and to provide means for effectively closing and sealing the pour spout after the liquid has been partially removed from the container by the user.

Other objects and advantages of this invention will be more readily understood by reference to the accompanying drawings and specification descriptive thereof.

Figure 1:
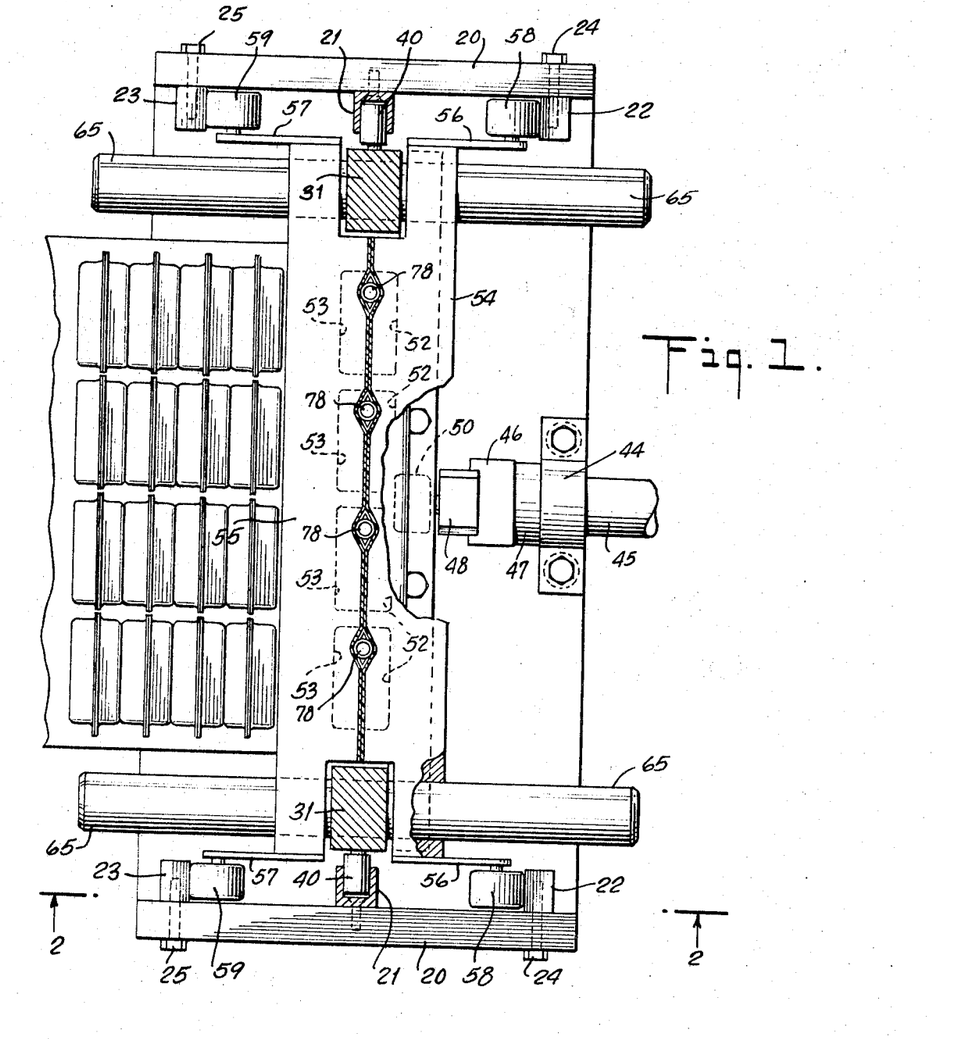
FIG. 1 is a partially sectional plan view of a machine for producing and filling four plastic containers at the same time.
Figure 2:
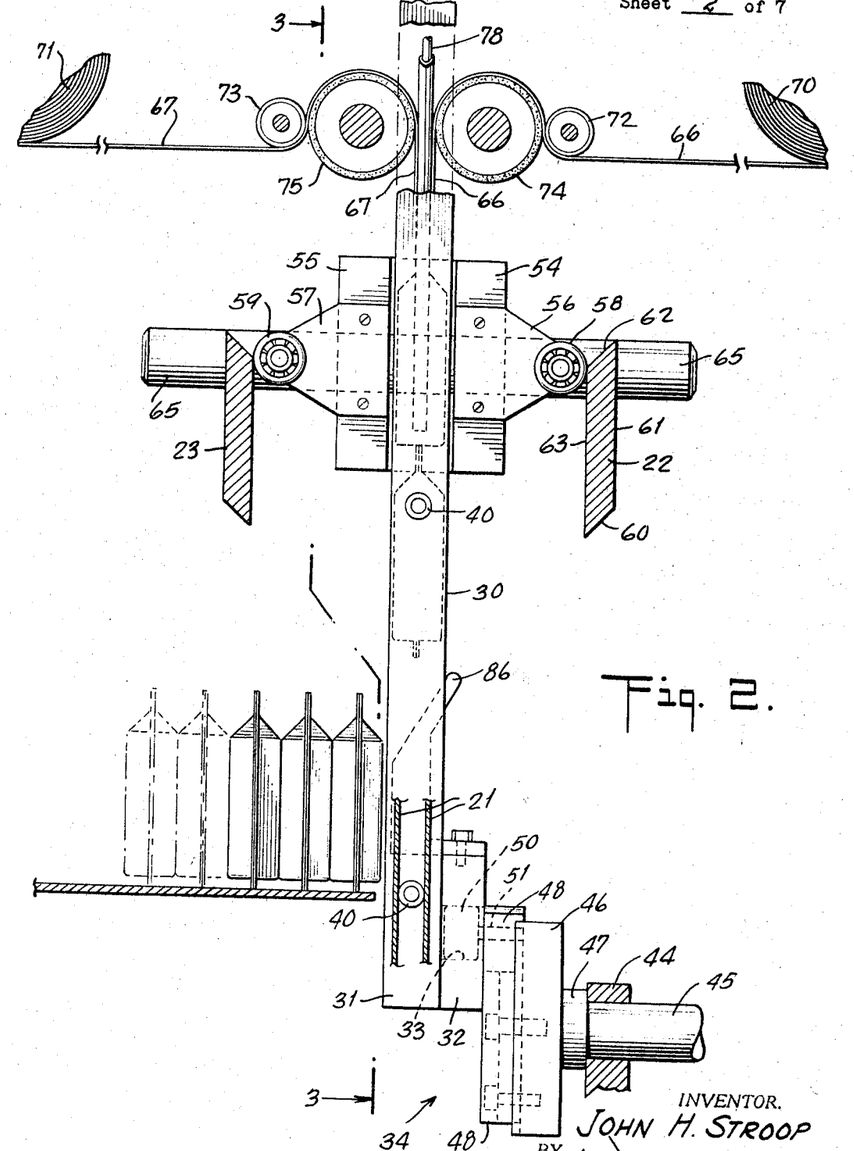
FIG. 2 is a partially sectional elevation taken on the line 2—2 of FIG. 1.
Figure 3:
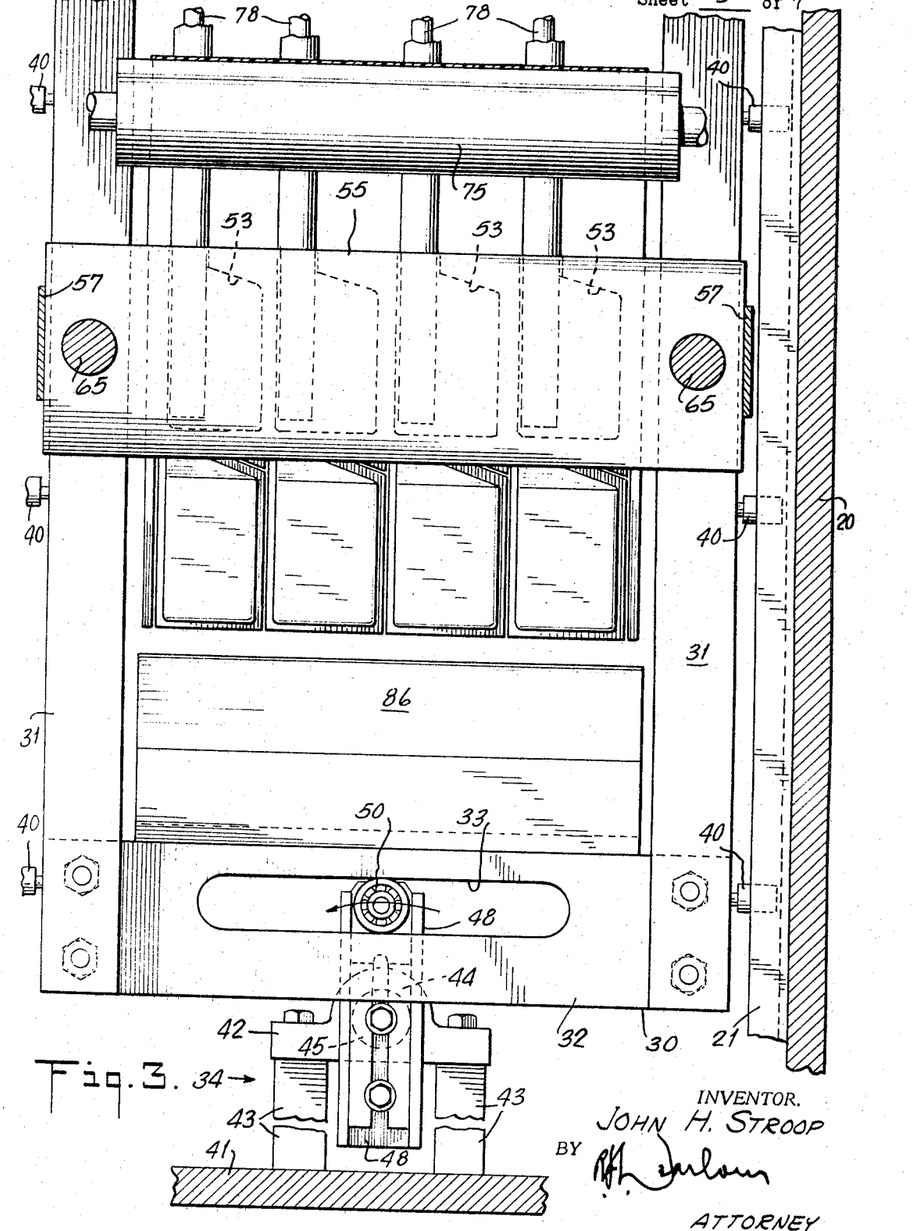
FIG. 3 is a partially sectional elevation taken on the line 3—3 of FIG. 2.

Referring specially to FIGS. 1, 2 and 3, the machine is composed of stationary side frames 20 to which are attached vertical guides 21, and each frame has two cams 22 and 23 affixed thereto by bolts 24 and 25, as clearly shown in FIG. 1.

The structure generally comprises a platen frame 30 having side beams 31 interconnected at the bottom by a drive beam 32 having a slot 33, as clearly shown in FIG. 3. This platen frame with everything supported thereby, is reciprocated vertically up and down by a crank mechanism 34. The platen frame is guided in its up-and-down movement by guide rollers 40 which extend outwardly into grooves of guides 21, as clearly shown in FIG. 1.

The crank mechanism 34 comprises a stationary base 41 on which is supported a bearing block 42 mounted on columns 43. A drive shaft 45 is moutned to rotate in bearing 44 and to rotate a base plate 46 spaced from the bearing 44 by boss 47. An arm 48, which is composed of two telescoping parts, is attached to the base plate 46. A roller or cam follower 50 is rotatably mounted on a pin 51 attached to the arm 48, the cam follower 50 being located in the slot 33, as shown in FIG. 3.

The stroke of the crank, which is the measure of the distance between the center line of drive shaft 45 and the center line of the pin 51 on which the cam follower 50 is mounted, may be adjusted by reason of the fact that the arm 48 is formed of two telescoping parts which may be clamped firmly in position to establish the desired stroke of the crank.

The rotation of the drive shaft 45 permits cam follower 50 to slide freely in the slot 33 and causes the platen frame 30 to reciprocate upwardly and downwardly for the purposes hereinafter explained.

The platen frame 30 supports a pair of platen guide pins 65 on which a mould structure having jaws 54 and 55 is slidably mounted. Individual moulds may be formed in any reasonable number on the mould structure so as to geratly multiply the capacity of the machine to turn out finished packages.

Moulds 52 and 53 for four packages are shown in the drawings on the mould structure, but only one of the four moulds is shown in detail in FIGS. 2, 4, 6 and 9.

Referring specially to these figures, the mould structure comprises the pair of jaws 54 and 55 which are provided with extensions 56 and 57 on which rollers or cam followers 58 and 59 are mounted. These cam followers 58 and 59 cooperate with the surfaces of stationary cams 22 and 23. The jaws of the mould structure are slidably mounted on the guide pins 65 which are rigidly attached to the side beams 31 of the platen frame 30. An upward movement of the platen frame first produces an upward movement of the cam followers 58 and 59 outward and upward along cam surfaces 60 and 61. Further movement of the cam followers causes them to pass over cam surface 62 and down on cam surface 63, as clearly shown in FIG. 6. While the cam followers are traversing cam surfaces 60 and 61, the jaws of the mould are in the open position of FIG. 4 and are substantially spaced apart from one another.

Figures 6, 7:
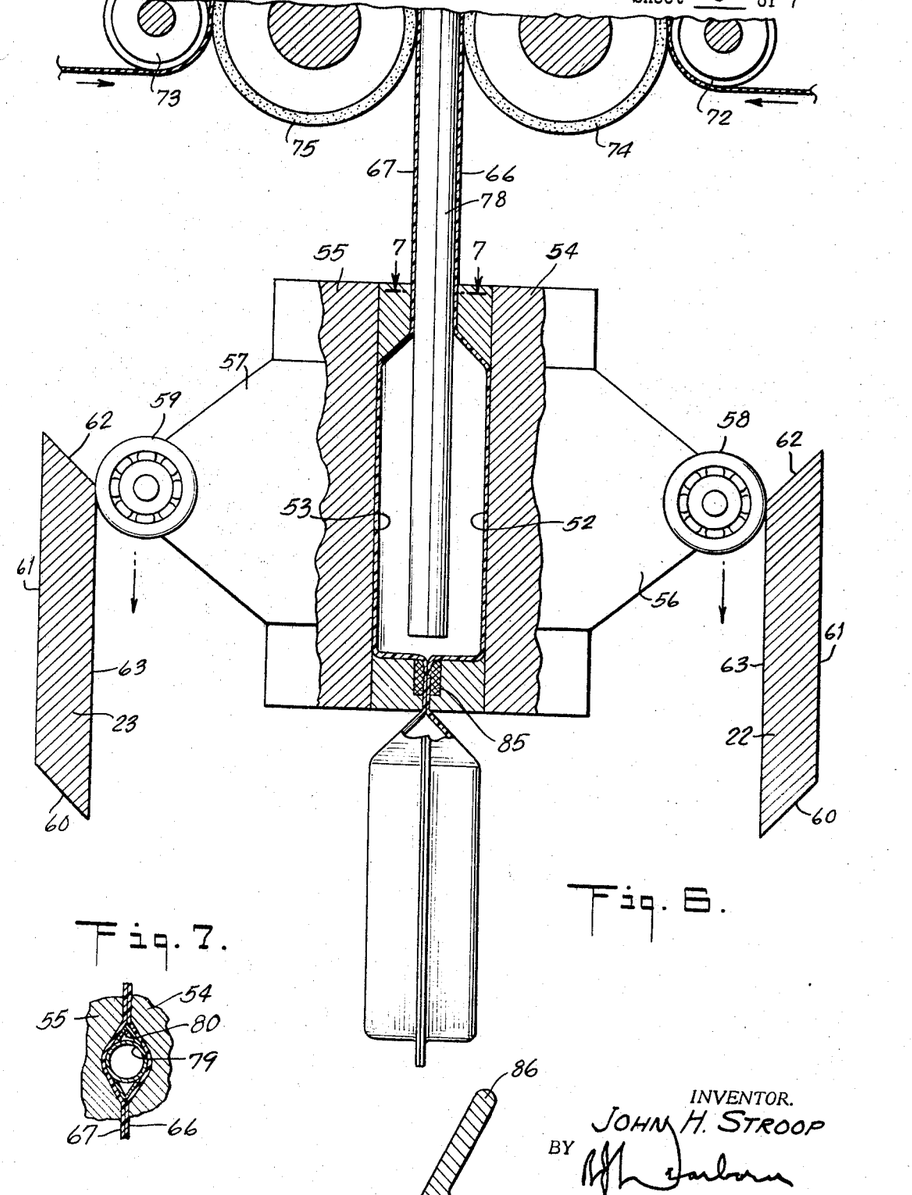
FIG. 6 is a view corresponding to FIG. 4 with the jaws of the mould structure closed and showing one of the packages formed therein and heat sealed.
FIG. 7 is a sectional detail taken on the line 7—7 of FIG. 6.
Figure 9:
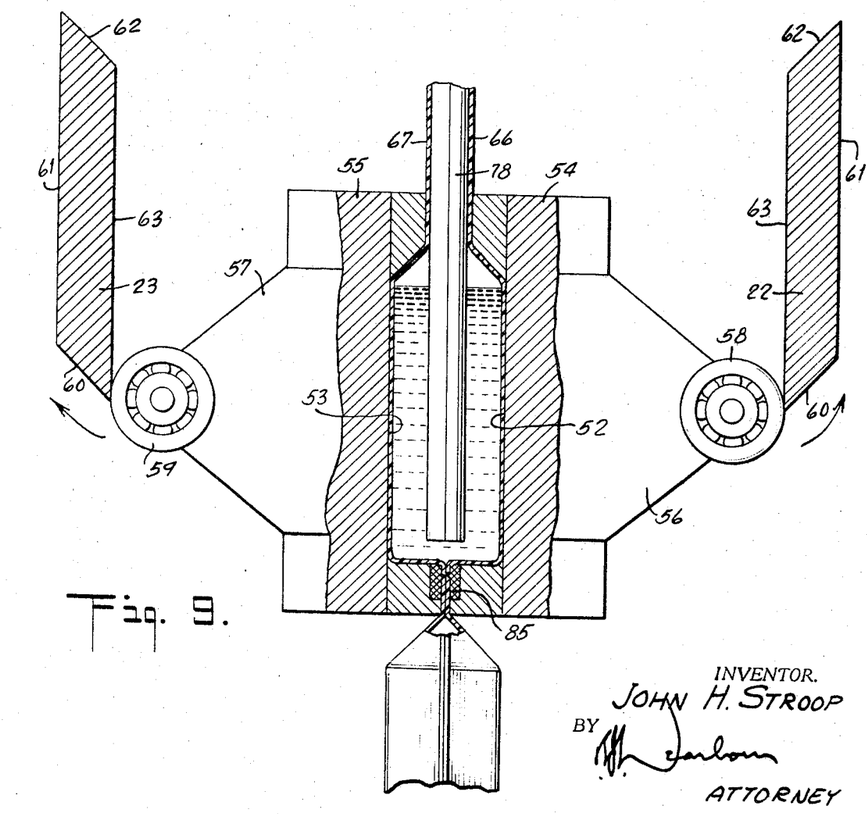
FIG. 9 corresponds to FIGS. 4 and 6, but shows the mould and the container therein filled and advanced almost to the point where the jaws are open. This view also shows a structure with electric heaters for sealing the bottom of the container just filled and the top of the filled package below and cutters for severing the two packages.
Figure 10:
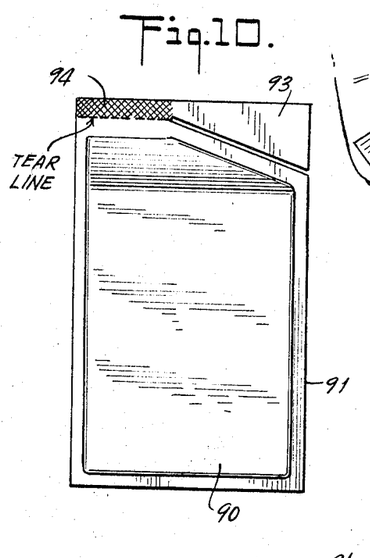
FIG. 10 shows a container produced according to the invention and filled with a liquid.

However, as the cam followers traverse surfaces 62 and then surfaces 63, the jaws of the mould are moved toward one another into the position shown in FIGS. 2, 6 and 9.

As clearly shown in FIG. 1, the jaws 54 and 55 of the mould structure of a machine adapted to handle four packages simultaneously are supported from the platen frame 30 by the spaced platen guide pins 65 which are anchored in the side beams 31, the platen jaws 54 and 55 being mounted to slide on the guide pins when they are moved in response to the action of the cams 22 and 23, as already explained.

The packages are formed from plastic sheets or curtains, as shown in FIG. 2. The sheets or curtains may be made either of plastic or metal foil or a combination of the two. Two curtains 66 and 67 of the desired width to accommodate the four packaging units are drawn from the supply rolls 70 and 71, are fed from thence around guide rollers 72 and 73 and cover about 50% of the outer surface of large heating drums 74 and 75. These two parallel curtains proceed downwardly between the jaws 54 and 55 of the mould structure.

Figures 4, 5:
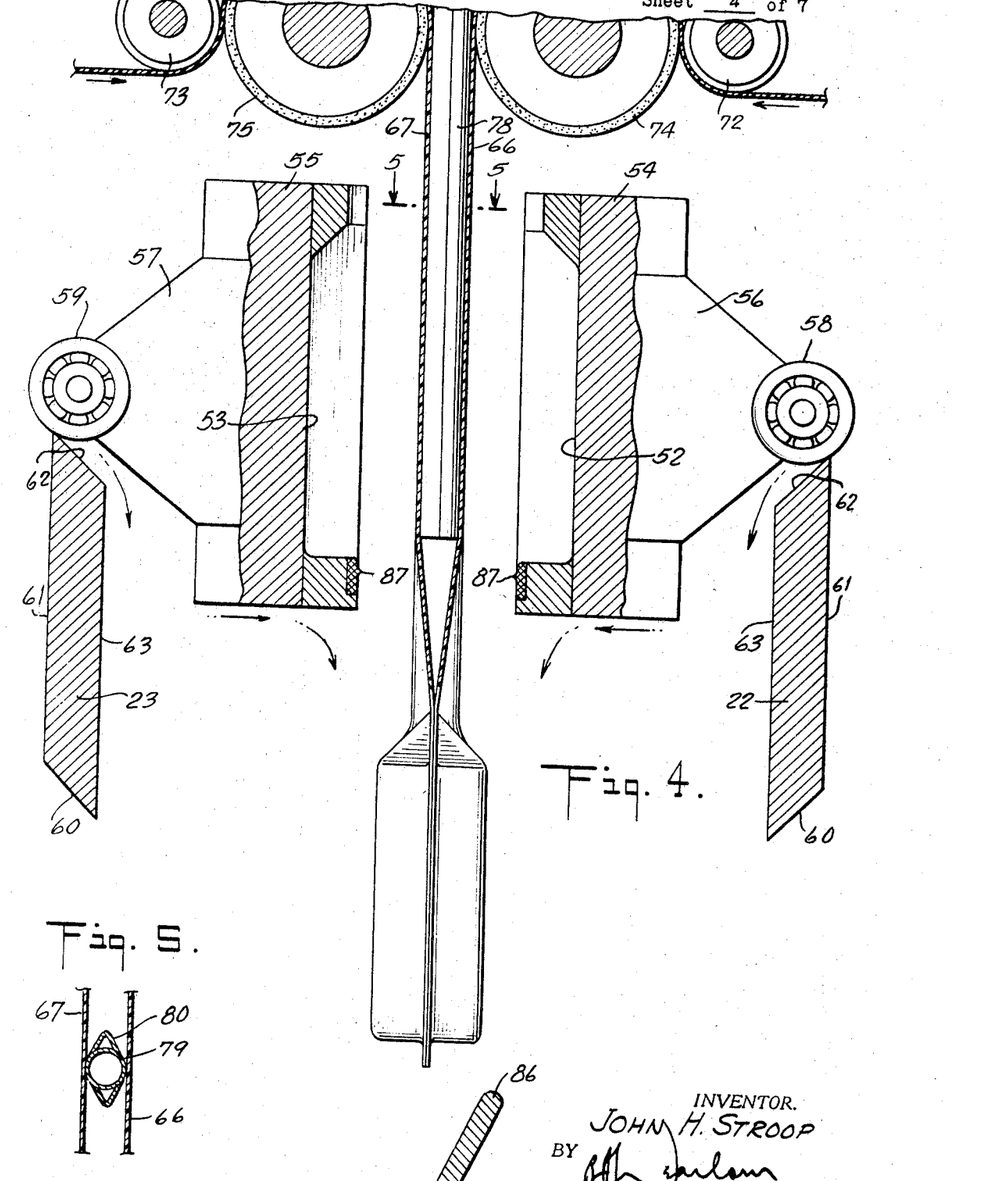
FIG. 4 is a sectional detail on a larger scale showing the mould structure with its jaws in an open position.
FIG. 5 is a sectional detail on the line 5—5 of FIG. 4 showing the multipassage tube.

Between the curtains each packaging unit has a multipassage tube 78 including an inner circular tube 79 and an elliptically shaped outer tube 80, which provides an inner opening common to each other and two side openings, as clearly shown in FIG. 5.

As shown in FIG. 4, the multipassage tube 78 fits closely between the sheets or curtains. As the sheets or curtains traverse the drums 74 and 75, they are heated to soften the plastic material sufficiently to permit the curtains to be blown outwardly into the moulds 52 and 53 carried by the jaws 54 and 55 of the mould structure by pumping air through the side openings 80. As shown in broken line in FIG. 2, the multipassage tube extends near to the bottom of the package when the package is first shaped, by the introduction of air, and is pulled out of the package when it is finished. The jaws of the package mould move up and down in accordance with the action of the crank mechanism upon the platen frame and the action of the cams 22 and 23 which opens the jaws when the package is finished.

When the air is first admitted between the curtains or sheets 66 and 67 and spreads then into the mould, they are sufficiently soft, due to the prior heating as they pass over drums 74 and 75, to seal together and set into the final shape of the mould and are sufficiently cooled by the mould so that the shape is maintained. After the necessary air pressure has been introduced to form the package and seal the two halves together, vacuum is established through the same tube thus creating a suction and drawing liquid, with which the package is to be filled, through the inner passage.

While the above procedure is the one which I now prefer, it is feasible to use the liquid with which the package is to be filled, as a means for forcing the curtains into the mould sections. In this case the inner tube passage is used directly to first force liquid between the curtains and into the package, while the outer tube passages are used as vents to permit the air to escape. When the package has been formed and filled, the switch valve is used to empty the tube by suction and prevent leakage.

As shown in FIG. 6, the package is formed and it is being filled as the jaws of the mould proceed downwardly. The tube remains at the same relative position and as the jaws are opened and ascend the tube is carried upward and is thus withdrawn from the package which is then complete and drops by gravity as it is cut off by the closing of the jaws on the next package. Small electric heaters 85 are located at the lower clamping portion of the jaws so that heat is applied at the bottom of one package being filled and at the top of the package below which is complete. Cutters 87, which are clearly shown in FIG. 4, are located at about the center of the heater so that they shear the curtains or sheets, thus separating the completely filled and sealed package below so that it descends by gravity and is then diverted by stacker member 86, and the successive packages are stacked as shown in FIG. 2.

The jaws of the mould are then separated by reason of the cam followers passing from the inner cam surfaces 63 and upward along beveled cam surfaces 60 and upward along the outer surfaces 61. In this operation the jaws are kept in open position as shown in FIG. 4. Then as the cam followers move along the beveled surfaces 62 the jaws are again forced into closed position, as shown in FIG. 6.

The moulds have a pinch-section (not shown) below the top seal which would weaken the region just below the seal in a well known manner to make the tear strip easy of removal when opening the package as hereinafter explained.

It is also possible that the multiple groups of packages may be formed in the moulds by applying vacuum to the back of the mould sections when they are closed thereby vacuum-forming the volumetric characteristics of the container and leaving the fill-tube open to atmosphere so that products other than liquids may be introduced into the containers.

Figure 8:
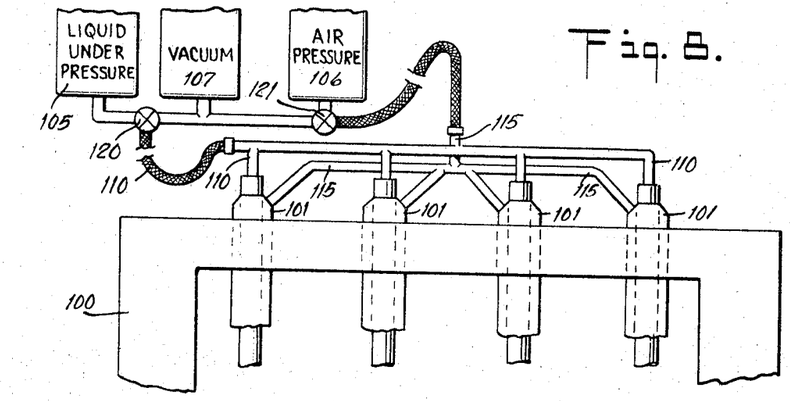
FIG. 8 is an elevation of the upper structure of the platen with the feed tubes supported on the upper bar of the platen frame and flexibly connected through switch valves to a supply tank or pumps adapted to supply either pressure or vacuum to the tubes to effect the blowing up of the packages or the filling of the packages, or vacuum suck-back to prevent leakage from the fill tube between cycles.

Refering specifically to FIG. 8, the platen frame 30 has a top cross beam 100 on which four rigid tubes 101, each having the multipassage structure of FIGS. 5 and 7, are securely mounted. As the platen frame is reciprocated, as above explained, the tubes also are moved up and down so that they are withdrawn from the four packages which have been completed and filled, and a new set of four packages is formed with the tubes extending to the bottom of the packages. Since the metal tubes are reciprocated, as above described, their inner tubes passages are connected to a liquid supply tank 105, and their outer passages are connected alternately to air pressure pump 106 and to a vacuum pump 107 by flexible couplings such as multipassage rubber tubes.

The conections are indicated in FIG. 8 as follows:

Feed line 110 is connected to each of the four tubes at the inner passage and is connected at the outer end to liquid supply tank 105 through a switch valve 120. A line 115 is connected to the outer passages of the four tubes and at its outer end is connected to an automatic switch valve 121.

In one position of the switch valve 121, line 115 is connected to the air pressure pump 106 and at the other position of the switch valve, line 115 is connected to the vacuum pump 107. The arrangement is such that when the platen frame rises to the top of its vertical stroke and closes the dies, the switch valve opens the passage to the air pressure thereby admitting air between the curtains or sheets and forcing them into the mould members while the curtains or sheets are relatively soft from the application of heat thereto at the drums 74 and 75.

As the platen frame descends with the packages formed within the closed moulds, the switch valve 121 is reversed and the packages are connected to the vacuum pump.

This action removes the air and at the same time sucks liquid from the tank 105 into the packages which are thus filled. This filling action continues until the central fill tube is about to be withdrawn from the filled package. The switch valve 120 on the fill tube closes off tank 105 and applies vacuum to the fill tube to prevent leakage between the cycles of filling and forming.

Figures 11, 12:
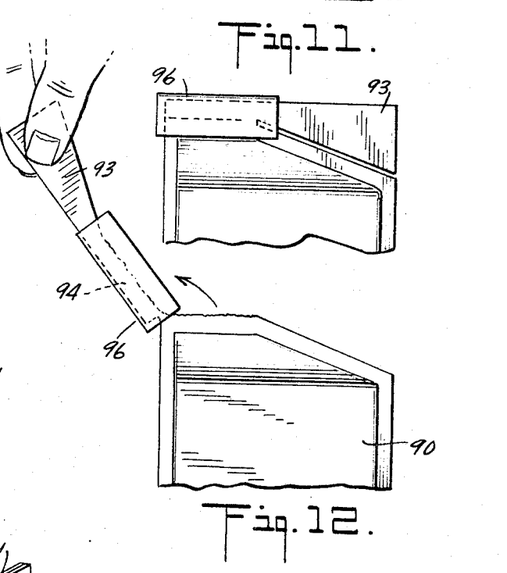
FIG. 11 shows the upper part of a container with an auxiliary seal cap which is useful to protect the package for sanitary reasons when it contains milk or other edible products.
FIG. 12 illustrates the tear strip by which the container is readily opened.
Figures 13, 14:
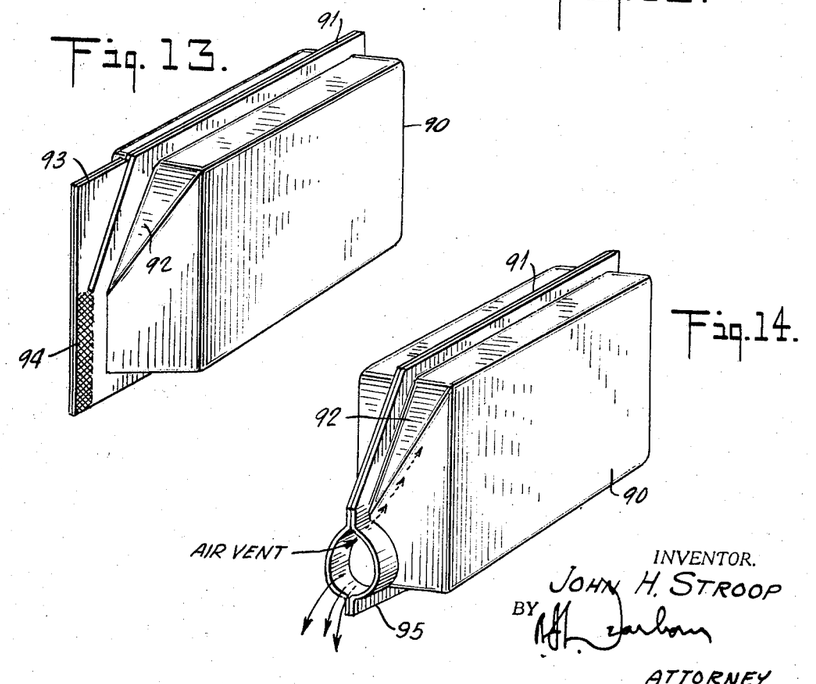
FIG. 13 is another perspective view showing the complete package before the tear strip has been used to open it.
FIG. 14 is a perspective view of the package opened and positioned to pour out the liquid content. The seal cap may be used to close the package after part of the contents has been poured out.

The shape of the packages will be determined by the moulds 52 and 53 and may have any suitable form. However, I prefer to form the packages as shown in FIGS. 10 to 14, inclusive. Referring specially to these figures, a comparatively flat package 90 of rectangular cross section has edge sealing strips 91 which are produced when the moulds 52 and 53 are forced together. One corner of the package has a beveled surface 92, and at this end of the package a tear strip 93 is formed at the bevel and across the end of the package, as shown at 94. The package is shown in elevation in FIG. 10 and the grip of the tear strip 93 is readily available to be pulled upwardly and swung over, as shown in FIG. 12. After the package is thus opened, it may be held in the position shown in FIG. 14 so that the liquid contents will readily pour out of opening 95 with air vent along beveled surface 92. If less than the total contents of the package is to be used at one time, then the package is returned to its upright position and a cap 96 may be placed over the flattened opening and used as a cover.

The shape of the packages makes them particularly adapted to be stacked as shown in FIG. 2. This shape also has the advantage of permitting a large number of packages to be inserted in a box or crate for shipment, and the loss of space which is typical of round or cylindrical packages is avoided.

The shape of the packages as shown in the drawings is intended to be by way of illustration only, and the shape may be modified in various ways and adapted to many products. The structure of the machine is also capable of various changes and modifications in its functioning without departing from the spirit of this invention, and only such limitations should be imposed as are indicated in the appended claims.

I claim:

1. A packaging machine used with a source of gas pressure, which comprises a vertically reciprocating platen frame, means for actuating said platen frame, cooperating jaw members mounted on said platen frame and adapted to slide at right angles to the plane of the frame, at least one package mould formed in the jaw members, means for feeding plastic sheets or curtains between the jaws, conduit means extending between the sheets and connectable to said source of gas pressure for forcing the sheets into the package mould to form a package between the jaws, and means for spreading the jaw members apart to release the package after it is formed therein.

2. The structure of claim 1 in which the jaw members in their open position are carried upward to act upon the sheets to form another package.

3. A package forming and filling machine used with a source of gas pressure, which comprises means for downwardly moving plastic sheets, means for warming the sheets, a pair of cooperating jaw moulds, means for closing the jaws, at a first vertical position, means extending between the sheets and connectable to said source of gas pressure for supplying air gas pressure between the sheets within the mould to form a package therein, means for filling the package as formed, power actuated means for moving the jaws downwardly, means for opening the jaws removing the finished package and repeating the operation to form a series of packages at a second position below said first positoin to release the package after it is formed therein, and means for returning the open jaws upwardly to said first position.

4. A package forming and filling machine used with a source of gas pressure, which comprises a platen frame, means for vertically reciprocating the platen frame, platen supporting pins affixed to the frame and extending at right angles to the plane of the frame, cooperating jaw members mounted to slide on the guide pins, means for downwardly moving plastic sheets extending between the jaw members, means for softening the plastic sheets as they approach the jaw members, and means extending between the sheets and connectable to said source of gas pressure for supplying gas pressure between the plastic sheets within the mould sections to produce a package of desired shape.

5. The structure of claim 4 in which said means extending between the shets comprises a tube connectable to said source of gas pressure for exerting gaseous pressure to force the sheets into the mould sections, means for filling the package as formed, and means for opening the platen jaws to release the package after it is formed therein.

6. A package forming and filling machine used with a source of gas pressure, and a source of filling substance, which comprises a stationary frame having spaced uprights, a movable platen frame having side beams slidably supported on the stationary frame, means for periodically reciprocating the platen frame, platen guide pins extending through the side beams of the movable platen and affixed thereto and a cooperating pair of jaws slidably mounted on said guide pins on opposite sides of the platen frame, a plurality of package moulds formed in the jaws, means for downwardly moving plastic sheets between the jaws, means extending between the sheets and connectable to said source of gas pressure for supplying gas pressure between the sheets within the moulds to form packages each time said pair of jaws are brought together, and connectable to said source of filling substance to fill the packages, means for sealing and separating the packages at the top and bottom, and means for opening the platen jaws to release the finished packages and means for moving the platen jaws upwardly after the previous packages are released therefrom, 7. The machine of claim 6 in which a stacker is associated with the motion of the platen frame to divert and stack the finished packages.

8. A package forming and filling machine used with a source of gas pressure, a source of filling substance, and a source of vacuum, which comprises a stationary frame having spaced uprights, a movable platen frame having side beams and a driving beam connecting the side beams at the bottom, a crank mechanism adapted to transmit a limited up-and-down reciprocating motion to the platen frame, a cooperating pair of platen jaws slidably mounted on opposite sides of the platen frame, a plurality of moulds formed in the platen jaws, plastic sheets depending from supply rolls and extending downwardly between the platen jaws, a feed tube extending downwardly between the platen jaws, a feed tube extending downwardly between the sheets for each mould and connectable to said source of gas pressure for supplying gas pressure between the sheets within the moulds to form packages each time said pair of jaws are brought together, and connectable to said source of vacuum to exhaust the air from the interior of the packages just formed, and connectable to said source of filling substance to fill the packages thus formed and exhausted, means for sealing and separating the packages at the top and bottom, means for opening the platen jaws to release the finished packages and means for moving the platen jaws upwardly after the previous packages are released therefrom to a new location on the sheets thereby repeating the operation.

References Cited

UNITED STATES PATENTS

| | | | |
|---|---|---|---|
| 2,113,658 | 4/1938 | Lakso | 53—180 |
| 2,432,373 | 12/1947 | Bleam et al. | 53—180 XR |
| 3,099,043 | 7/1963 | Held. | |
| 3,142,089 | 7/1964 | Wilkalis et al. | |
| 3,327,035 | 6/1967 | Parfrey. | |

TRAVIS S. McGEHEE, *Primary Examiner.*

U.S. Cl. X.R.

53—184, 140, 141; 206—56